United States Patent Office 3,171,312
Patented Mar. 2, 1965

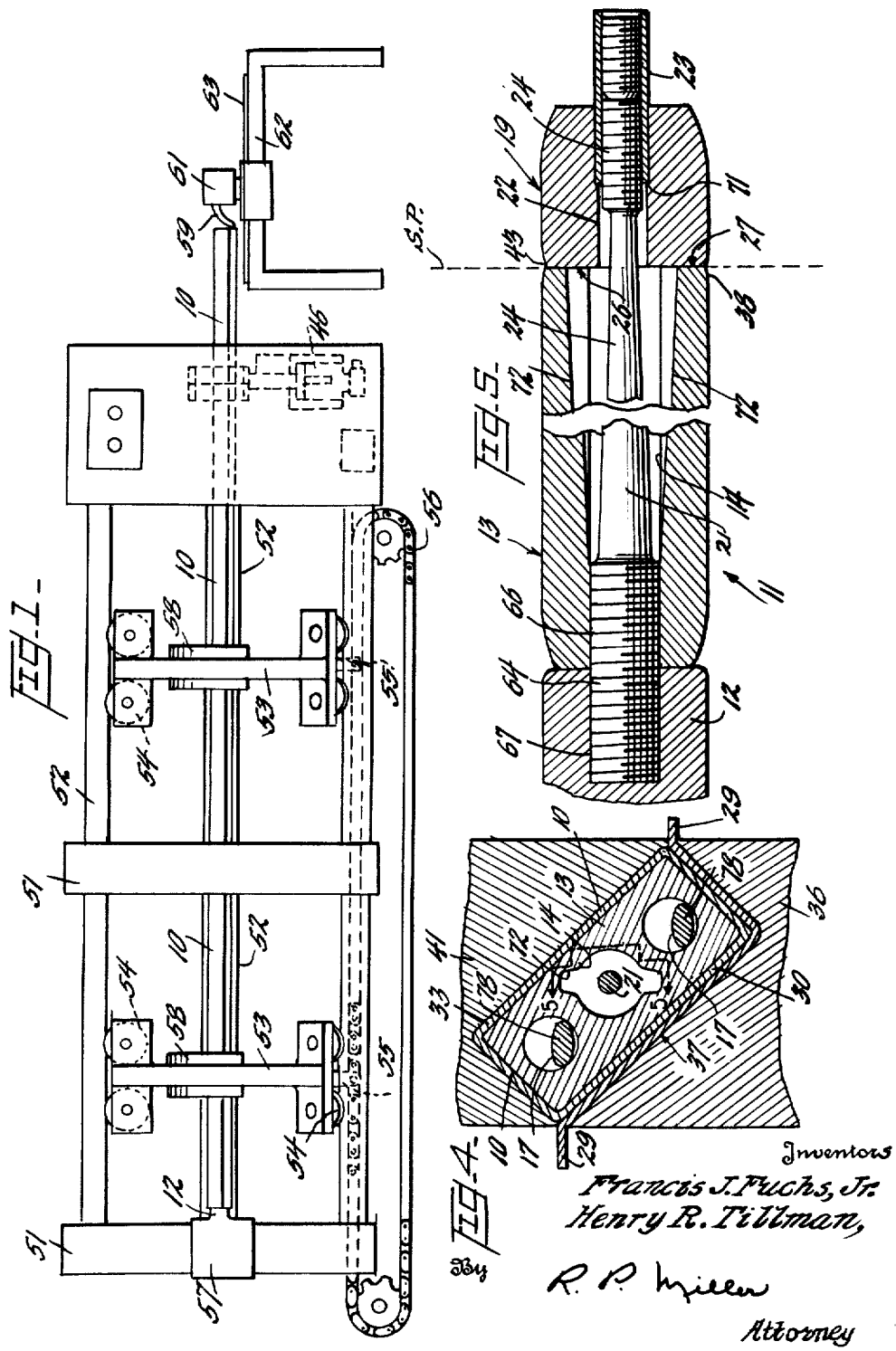

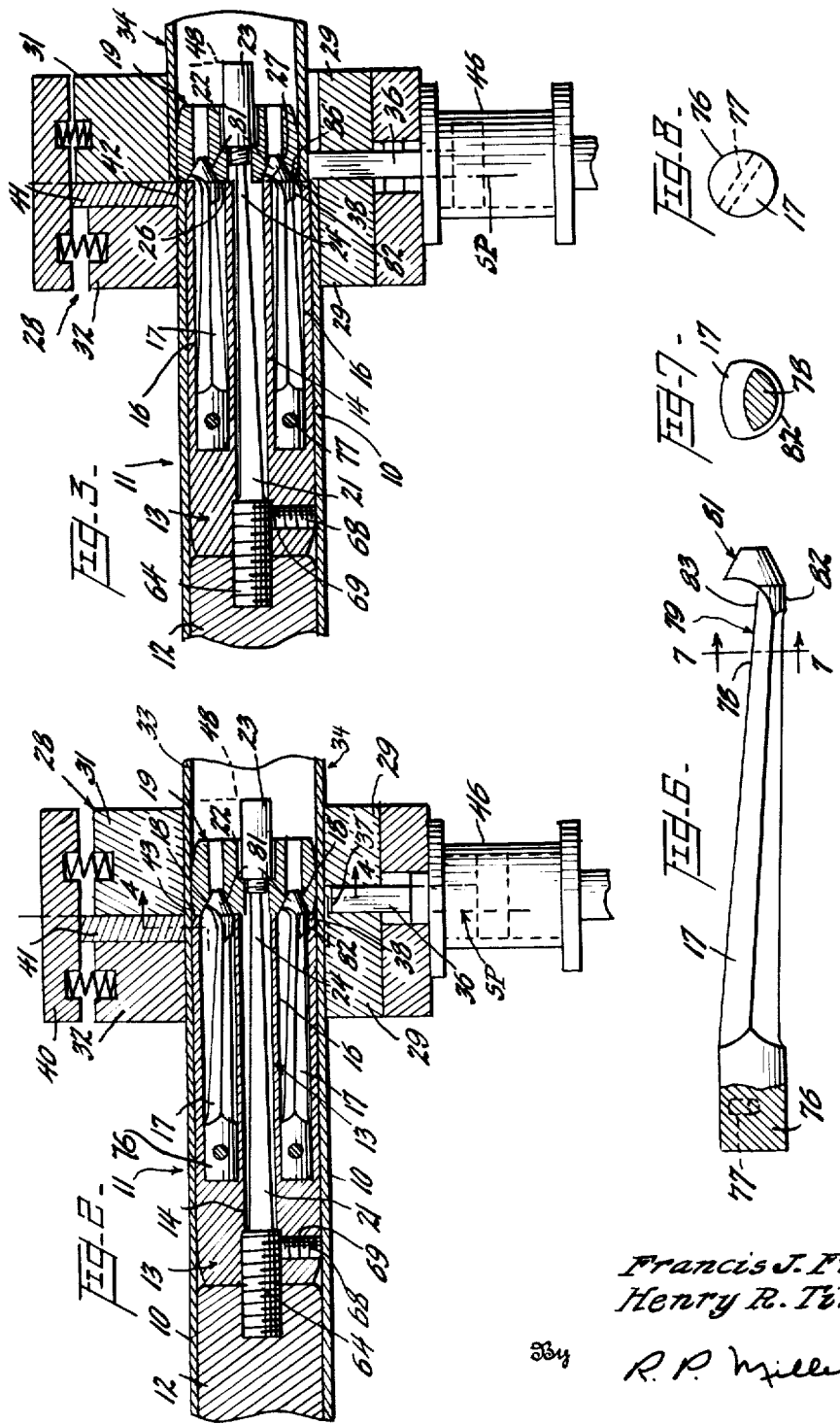

3,171,312
MECHANISM FOR SHEARING TUBULAR
MEMBERS
Francis J. Fuchs, Jr., and Henry R. Tillman, Winston-Salem, N.C., assignors to Western Electric Company, Incorporated, New York, N.Y., a corporation of New York
Filed Dec. 6, 1961, Ser. No. 157,340
6 Claims. (Cl. 83—191)

This invention relates to a mechanism for shearing tubular members and more particularly to a mandrel having a laterally displaceable section maintained in end-to-end abutment and axial alignment with the mandrel by a resilient cantilever device.

In the manufacture of tubular members, such as waveguides, conduits, pipes, etc., it is often necessary to cut the members into preselected lengths. More particularly, in the manufacture of waveguides, it is necessary to accurately and quickly cut each waveguide to a preselected length without forming burrs or out-of-square ends and without collapsing or deforming the walls. Previously it has been the practice to use hand saws, but burrs were formed and the inner walls of the waveguide were deformed during the sawing operation, thus resulting in a product that had unsatisfactory electrical characteristics.

Efforts of alleviate these difficulties resulted in the development of mandrels which were inserted into the waveguides to support the inner walls. The mandrels were constructed in two sections, one fixed and one movable. A fixed external shear cooperated with the fixed mandrel section and held the waveguide stationary. A second external shear was moved for shearing a section of the waveguide while the movable mandrel section supported the walls of the sheared waveguide section. Certain structural elements used in this type of mandrel permitted the movable mandrel section to move away from the fixed mandrel section along the axis of the mandrel. Because of this axial movement, the problems of burring and non-uniform cuts were still present.

An object of this invention is to provide a new and improved shearing mechanism for tubular members.

A further object of this invention resides in a mandrel for supporting a waveguide during a shearing operation in which problems of burring, collapsing walls, and non-uniform cuts are alleviated.

Another object of this invention is to provide a mandrel assembly wherein fixed and movable pairs of internal and external shearing dies are maintained in abutting relationship by a transversely, resilient, cantilever instrumentality.

Still another objects of this invention is the provision of a resilient cantilever device for holding a movable internal shearing die against a fixed internal die wherein the resilient cantilever device urges the movable die in abutting engagement with the fixed die and maintains the dies in a shearing plane with a force that increases as the transverse displacement of the movable and fixed dies increases.

A further object of this invention resides in the provision of diametrically opposed slots in a mandrel for receiving resilient cantilever members which extend axially from the mandrel through a shearing plane into tapered recesses formed in a movable internal shearing die wherein the resilient cantilever members urge the die into axial alignment with the mandrel, but which permit movement of the die to effectuate the shearing of a tubular member while supporting inner surfaces of the member against collapse.

With these and other objects in view, the present invention contemplates a mandrel having a movable shearing die which is supported by a resilient cantilever tie rod and a pair of resilient fingers for transverse movement along a shear plane. The resilient cantilever fingers project from a main body section of the mandrel through the shear plane into conical recesses formed in the movable shearing die. In use of the mandrel with external shearing dies, a tube or waveguide is placed over the mandrel whereafter the dies are moved and a shearing force is applied to the waveguide along the shearing plane. As the shearing dies move, the tie rod and fingers are flexed and exert a force that tends to return the movable shearing die into axial alignment with the main body section. Also, as the tie rod is flexed, a threaded sleeve that is secured to the tie rod is moved in an arcuate path. The sleeve acts on the movable shearing die so that this die is maintained in abutment with the main body section with a force that increases as the transverse displacement of the movable die increases.

Other objects and advantages of the present invention will become apparent from the following detailed description and the accompanying drawings, in which:

FIG. 1 is a side elevational view of a mechanism for shearing tubular members showing a carriage for advancing a tubular member to an improved shearing mandrel and die assembly constructed in accordance with the principles of the invention;

FIG. 2 is an enlarged cross-sectional view of the mandrel and die assembly shown in FIG. 1 showing the mandrel assembly supporting the tubular member prior to a shearing operation, and particularly showing the details of a pair of cantilever supports for a movable die section of the mandrel;

FIG. 3 is a cross-sectional view of the disclosure of FIG. 2 showing the movable die section of the mandrel assembly moved upwardly by a shear blade during a shearing operation;

FIG. 4 is a sectional view taken along line 4—4 of FIG. 2 showing a tapered slot provided in a main body section of the mandrel for receiving a resilient cantilever tie rod that is flexed during the shearing operation;

FIG. 5 is a cross-sectional view taken along line 5—5 of FIG. 4 showing the resilient cantilever tie rod maintaining the main body section of the mandrel and the movable die section in abutment with a force that increases as the movable die section is transversely displaced from the main body section during the shearing operation;

FIG. 6 is an enlarged sectional view of one of the pair of cantilever supports shown in FIG. 2 illustrating a stop knob formed on the cantilever support which maintains the movable die section and the main body section locked in alignment;

FIG. 7 is a cross-sectional view taken along line 7—7 of FIG. 6 showing the generally elliptical cross-sectional configuration of the cantilever supports; and FIG. 8 is an end view of the resilient cantilever finger shown in FIG. 6 illustrating an aperture for receiving a pin which fixes the finger in an aperture formed in the main body section.

Referring in particular to FIG. 2, a tubular member or work piece such as a pipe, conduit, or waveguide 10, is shown mounted on a mandrel assembly 11. The waveguide 10 may be rectangular in cross section and the mandrel assembly 11 arranged to position the waveguide at an angle with respect to the horizontal (see FIG. 4).

The mandrel assembly includes an arbor 12 that supports a main body section or fixed plug 13. The fixed plug 13 extends horizontally from the arbor 12 and terminates along one side of a vertical shearing plane SP. A central bore 14 is machined in the fixed plug 13 along the axis thereof. A pair of apertures 16 formed in the fixed plug extend from the shearing plane SP into the fixed plug. A pair of oppositely disposed cantilever supports or fingers 17 are anchored in the apertures. The cantilever fingers extend from the aperture, pass through the shearing plane SP, and are received in conical bearing recesses 18 formed in a movable plug or movable body section 19 of the mandrel.

The movable plug 19 extends axially away from the fixed plug 13 from the other side of the shearing plane SP. A tie rod or arbor stud 21 is secured to the fixed plug 13 in the bore 14 and extends through the shearing plane SP into a counterbored aperture 22 formed in the movable plug 19. A threaded sleeve or fastener 23 is drawn up on an unsupported threaded end 24 of the tie rod 21 so that the face 26 (see FIGS. 3 and 5) of the movable plug 19 that is adjacent to the shear plane SP is maintained in abutment with the corresponding face 27 of the fixed plug 13.

Still referring to FIG. 2, a clamp 28 is shown holding the waveguide 10 at a fixed axial position on the mandrel 11. The clamp 28 includes a pair of fixed lower pads 29 which surround and support the lower two walls 30 of the rectangular waveguide 10 on opposite sides of the shearing plane SP (see also FIG. 4). Similarly, resiliently biased upper pads 31 and 32 extend along the upper walls 33 of the waveguide 10 and urge the waveguide downwardly against the fixed lower pads 29.

The apparatus is adapted to shear sections of tubular members, and in the present example, the section 34 of the waveguide 10 extending to the right of the shearing plane SP may be sheared from the remainder of the waveguide. A lower shear blade or die 36 is mounted for vertical reciprocation along the shearing plane SP in a space provided between the lower clamp pads 29. The lower shear blade 36 is formed so that a shearing edge 37 thereof corresponds to the cross-sectional configuration of the lower half of the rectangular waveguide 10 (see FIG. 4). A die or shearing edge 38 is formed on the fixed plug 13 to provide the second member of a shear-type cutting couple with the lower shear blade 36.

An upper die or shear blade 41 is fixed to a support 40 and is similarly formed with a shearing edge 42 (see FIG. 2) that corresponds to the cross-sectional configuration of the upper half of the rectangular waveguide 10. The movable plug 19 is also provided with a die or shear edge 43 that forms the second member of a shear-type cutting couple with the upper shear blade 41.

The operational sequence will become apparent upon successive reference to FIGS. 2 and 3. As described above, FIG. 2 shows the waveguide 10 mounted on the mandrel 11 and held thereon in a fixed axial position by the clamp 28 so that the section 34 to be sheared extends to the right across the shearing plane SP. A fluid motor 46 advances the lower shear blade 36 upwardly into the position shown in FIG. 3. The lower shear blade 36 moves the lower two walls 30 of the waveguide section 34 upwardly relative to the shear edge 38 and shears the lower walls 30 of the waveguide 10 along the shearing plane SP. The lower shear blade 36 also acts through the lower walls 30 and advance the movable plug 19 upwardly. The movable plug 19 supports the walls of the waveguide and moves the upper walls 33 relative to the upper shear blade 41 to shear the upper walls 33 of the waveguide.

It may be observed that the fingers 17 and the tie rod 21 are flexed, and therefore tend to urge the movable plug 19 downwardly into alignment with the axis of the fixed plug 13. Additionally, the threaded sleeve 23 is moved through an arcuate path 48 (shown in dotted lines in FIGS. 2 and 3) as the movable plug 19 advances upwardly. Therefore, it is apparent that as the movable plug 19 is advanced upwardly, the left face 26 of the movable plug 19 moves along and is maintained in the shearing plane SP by an increasing force so that the waveguide 10 may be accurately sheared. When the lower shear blade 36 is retracted, the resilient cantilever action of the fingers 17 and the tie rod 21 return the movable plug 19 to alignment with the fixed plug 13.

Referring in detail to FIG. 1, a frame 51 is shown supporting three equally spaced guide rods 52. Each of two carriages 53 is provided with sets of rollers 54 which straddle and are guided by the spaced guide rods 52. Each carriage 53 is provided with a drive lug 55 which is intermittently advanced by an indexing chain conveyor 56.

The mandrel assembly 11 includes the elongated arbor 12 which is mounted on an arbor clamp head 57 that is secured to the frame 51. The arbor 12 extends to the right from the arbor clamp head 57, through the carriages 53, and terminates at the mandrel assembly 11. The waveguide tube 10 is placed over the mandrel 11 and the arbor 12. The waveguide 10 is advanced to the left until the waveguide engages the arbor clamp head 57. Clamps 58 that are mounted on the carriages 53 and surround the waveguide 10, may be actuated to grip the waveguide 10 with sufficient force to advance the waveguide to the right as the carriages 53 are advanced without clamping the waveguide to the arbor 12. The waveguide 10 is in this manner advanced along the arbor 12 to locate successive sections 34 (FIGS. 2 and 3) to be sheared on the right side of the shearing plane SP.

The carriages 53 advance the waveguide 10 to the right as shown in FIG. 1 until the waveguide engages a sensor arm 59 of a length indicator 61 that is adjustably mounted on a bed 62. The bed 62 is provided with indicia such as a scale 63 so that the length indicator 61 may be positioned and clamped to the bed 62 to measure lengths of waveguide for successive shearing operation. After a shearing operation has been completed, an operator or suitable automatic facilities (not shown) may index the chain conveyor 56 to position a successive length of waveguide tubing into position for shearing.

Considering now FIG. 5 for a detailed description of the mandrel assembly 11, a threaded portion 64 of the tie rod 21 is threaded into a tapped section 66 of the bore 14. The arbor 12 is provided with a tapped aperture 67 into which the threaded portion 64 of the tie rod 21 is also threaded, so that the fixed plug 13 and the arbor 12 are fixed in abutting end-to-end relationship. As shown in FIG. 2, a set screw 68 is received in a tapped aperture 69 that is machined in and is perpendicular to the longitudinal axis of the fixed plug 13 for preventing the tie rod 21 from rotating relative thereto.

The tie rod 21 extends to the right from the arbor 12 through the bore 14 and into the counterbored aperture 22. It may be appreciated that the tie rod 21 is thus mounted as a cantilever member and may be fabricated from spring tempered steel to provide a certain degree of transverse resiliency while at the same time having a high degree of axial or tensile strength.

The fastener 23 is threaded onto the free end 24 of the resilient cantilever tie rod 21. As the fastener 23 is drawn up on the threaded end 24 of the tie rod, the left end of the fastener engages a shoulder 71 of the counterbored aperture 22 and secures the left face 26 of the movable plug 19 in end-to-end abutting relationship with the right face 27 of the fixed plug 13. The respective left and right faces 26 and 27 of the movable and fixed plugs 19 and 13 are thereby maintained in abutment for relative shearing movement along the shearing plane SP.

As shown in FIGS. 4 and 5, an elongated slot 72 is formed on either side of the bore 14 so that upon shearing movement of the movable plug 19 relative to the fixed plug 13, the tie rod 21 may flex in the vertical direction as shown in FIG. 4. Inasmuch as the left threaded end 64 of the tie rod 21 is secured to the arbor 12 and is thus maintained in a fixed axial position, it may be understood that when the movable plug 19 is advanced upwardly during the shearing operation, the left end of the fastener 23 moves in the arcuate path 48 as shown in dotted lines in FIGS. 2 and 3. Thus, as the movable plug 19 moves transversely out of alignment with the fixed plug 13, the fastener 23 urges the movable plug further toward the fixed plug with a force that increases as the transverse displacement of the movable plug increases. It is apparent, therefore, that as the movable plug 19 is transversely displaced, the left face 26 of the movable plug moves along and is maintained in the shear plane SP by an increasing force so that the waveguide 10 may be accurately sheared.

Referring to FIGS. 2 and 4, the apertures 16 are shown machined on diametrically opposite sides of the bore 14. A cylindrical end 76 of the cantilever fingers 17 is received in each of the apertures 16 and is assembled with the fixed plug 13 by a pin 77. As shown in detail in FIG. 6, the cross section of the cantilever fingers 17 varies from cylindrical at the left end 76 to generally elliptical at a point 78 as shown in FIG. 7. The cantilever fingers 17 terminate in an unsupported or free end 79 which is provided with a tapered knob 81. Between the point 78 and the tapered knob 81, a semi-cylindrical stop surface 82 is formed on the free end 79 of each of the fingers 17.

As shown in FIG. 3, the cantilever fingers 17 extend through the apertures 16 across the shear plane SP and into the conical bearing recesses 18. Because the cross section of the fingers 17 at the point 78 is elliptical, a cutout portion 83 is formed in the fingers. Provision of the cutout portion 83 permits the free end 79 of the fingers 17 to advance upwardly with the movable plug 19 during the shearing operation so that the fingers clear and thus do not engage the walls of the aperture 16.

As the free end 79 of the fingers 17 is advanced upwardly, the fingers 17 are flexed so that at the completion of a shearing operation, the tapered knobs 81 are urged against the conical recesses 18 to bias the movable plug 19 downwardly into axial alignment with the fixed plug 13.

As shown in FIG. 2, when the movable plug 19 is in alignment with the longitudinal axis of the fixed plug 13, the cylindrical stop surface 82 of each of the fingers 17 is in engagement with a lower wall surface 86 (see FIG. 3) of the apertures 16 to positively stop downward movement of the movable plug 19. It may be appreciated that the cantilever fingers 17 are formed and received in the apertures 16 so that the tapered knob 81 ends to constantly urge the movable plug 19 downwardly even when the movable plug is in axial alignment with the fixed plug 13. In addition, each of the tapered knobs 81 is snugly received in its respective conical recess 18 and engages the entire surface thereof. Thus, as each finger 17 holds the stop surface 82 against the lower walls 86 of the apertures 16, the surface of the tapered knob 81 that is opposite to the stop surface 82 engages the surface of the conical recess 18 and prevents the movable plug 19 from advancing further downwardly. In this manner, after the fluid motor 46 has been reversed and the sheared waveguide section 34 removed, the movable plug 19 is positively maintained in exact alignment with the fixed plug 13 to preclude scraping of the inner wall surface of the waveguide 10 as the carriages 53 advance the waveguide 10 into position for a successive shearing operation.

It is to be understood that the above-described arrangements are simply illustrative of an application of the principles of the invention and many other modifications may be made without departing from the spirit and scope of the invention.

What is claimed is:

1. A mandrel assembly comprising a first section, a plurality of resilient cantilevers mounted in and projecting from one face of said first section, a second section having a plurality of recesses for receiving said cantilevers, said cantilevers constantly urging said second section into alignment with said first section, and a tie rod interconnecting the two sections.

2. In a mandrel assembly for supporting a pipe during a shearing operation, an elongated body member extending through the pipe and terminated in a first shearing face on one side of a shear-plane, said member having a bore extending from said shear plane, a shear plug having a second shearing face movable along the other side of the shear plane, a pair of resilient members for constantly urging the second shearing face into axial alignment with the first shearing face, a resilient cantilever tie rod having a first end anchored in the end of said bore and a second end mounted in the shear plug for movement therewith, said body member having a tapered slot formed in the bore for receiving the tie rod during movement of the shear plug along the shear plane, and means for moving the shear plug along the shear plane.

3. In a mandrel assembly for supporting a hollow article during a shearing operation, an elongated body member having a pair of axially extending and diametrically opposed apertures terminating at one end face of the member, a pair of resilient rods anchored to the member and extending through said aperture to project beyond said end face, said extending portions of said rods being tapered, a plug having a pair of tapered recesses, said plug being constantly urged into alignment with said body member by said resilient rods, and means for slidably holding the plug to position the tapered portions of said rods in said recesses.

4. A pipe assembly for supporting a pipe during a pipe shearing operation comprising a pipe-space mandrel having a shearing face positioned in a shear plane and a body portion extending axially therefrom into the pipe space, said mandrel having a slot extending axially from said shear plane in the direction of the body portion, a shear plug provided with a shearing face slidable on the mandrel shearing face for movement in the shear plane, said plug having a bearing recess extending thereinto from the shear plane, a tie rod connected to the mandrel and extending into the shear plug, means for limiting relative axial movement therebetween to maintain the shearing faces in abutting relationship, a resilient cantilever member secured in the slot and extending therethrough into said bearing recess, and a stop knob formed on the free end of the cantilever member and urged thereby into the slot and the bearing recess for precluding sliding movement of said shearing faces in a predetermined direction in the shear plane.

5. In a pipe-space mandrel assembly, an elongated body member having a fixed shearing face, said member having a pair of spaced longitudinal bores and a central bore, a shear plug having a shear face slidable on the fixed shearing face, said plug having a pair of bearing recesses opposite to said longitudinal bores and a counterbored aperture opposite to said central bore, a resilient cantilever tie rod secured in and extending through the central bore into the counterbored aperture, a fastener secured to the other end of the rod and urged against a counterbored step of the aperture for holding the shearing faces in engagement for relative transverse shearing movement, and a pair of resilient cantilever arms secured in and extending through said longitudinal bores, each of said cantilever arms having a stop knob formed on the free end thereof and urged into the bearing recesses for restraining the transverse shearing movement of the shearing plug.

6. In a mandrel assembly for shearing a hollow waveguide along a shear plane, an elongated body member having a fixed shearing face positioned in the shear plane and extending axially into the hollow waveguide, said member having a pair of spaced outer bores and a central bore formed between the outer bores terminating at the shearing face, a shear plug having a shear face slidable on the fixed shearing face in the shear plane, said plug having a bearing recess opposite to each of the outer bores and a counterbored aperture opposite to said central bore, a resilient cantilever tie rod secured in and extending through the central bore and the shear plane into the counterbored aperture, a fastener secured to the other end of the rod and urged thereby against a counterbored step of the aperture for holding the shearing faces in engagement for relative transverse shearing movement in the shear plane, and a resilient cantilever arm secured in and extending through each outer bore and the shear plane, said cantilever arm having a stop knob formed on the end thereof and urged into the bearing recess for restraining the transverse shearing movement of the shear plug.

References Cited by the Examiner
UNITED STATES PATENTS

| | | | |
|---|---|---|---|
| 2,038,255 | 4/36 | Worthington | 82—54 |
| 2,435,469 | 2/48 | Roop | 83—186 |
| 2,526,163 | 10/50 | Shippy et al. | 83—182 X |
| 2,627,921 | 2/53 | Brehm | 83—181 X |
| 2,669,302 | 2/54 | Brehm | 83—186 |
| 2,701,014 | 2/55 | Daukus | 83—190 |
| 2,856,997 | 10/58 | Lafferty | 83—190 |

WILLIAM W. DYER, Jr, *Primary Examiner.*
CARL W. TOMLIN, *Examiner.*